United States Patent [19]

Schimmel et al.

[11] Patent Number: 4,503,016

[45] Date of Patent: Mar. 5, 1985

[54] PROCESS FOR EXTRACTING HEAVY METAL IONS FROM AQUEOUS SOLUTIONS

[75] Inventors: Günther Schimmel, Erftstadt; Werner Krause; Reinhard Gradl, both of Hürth, all of Fed. Rep. of Germany

[73] Assignee: Hoechst Aktiengesellschaft, Fed. Rep. of Germany

[21] Appl. No.: 582,138

[22] Filed: Feb. 23, 1984

Related U.S. Application Data

[63] Continuation of Ser. No. 396,239, Jul. 8, 1982, abandoned.

[30] Foreign Application Priority Data

Jul. 15, 1981 [DE] Fed. Rep. of Germany ....... 3127900

[51] Int. Cl.$^3$ .................... C01G 3/00; C01G 11/00; C01G 9/00; C01G 28/00
[52] U.S. Cl. ........................................ 423/24; 423/42; 423/87; 423/100; 423/101; 423/321 R; 423/321 S; 423/658.5; 423/DIG. 14
[58] Field of Search ................ 423/24, 139, DIG. 14, 423/321 S, 321 R, 10, 658.5, 42, 101, 100, 87

[56] References Cited

U.S. PATENT DOCUMENTS

| | | | |
|---|---|---|---|
| 3,211,521 | 10/1965 | George | 423/139 |
| 3,666,446 | 5/1972 | Cook | 423/100 |
| 4,226,791 | 10/1980 | Reinhardt | 423/139 |
| 4,255,392 | 3/1981 | Chiang | 423/139 |
| 4,339,416 | 7/1982 | Fitoussi | 423/10 |

FOREIGN PATENT DOCUMENTS

| | | | |
|---|---|---|---|
| 23428 | 2/1981 | European Pat. Off. . | |
| 78427 | 6/1981 | Japan | 423/87 |
| 791592 | 3/1979 | U.S.S.R. . | |

*Primary Examiner*—John Doll
*Assistant Examiner*—Robert L. Stol
*Attorney, Agent, or Firm*—Connolly and Hutz

[57] ABSTRACT

The disclosure relates to a process for liquid/liquid-extraction of heavy metal ions from acid aqueous solutions with the aid of water-insoluble dithiophosphoric acid diesters as extracting agents. More particularly, use is made of phosphoric acid solutions with a $P_2O_5$-content of from 3 to 80 weight %, the solutions being free from emulsion-forming organic contaminants or having previously been freed therefrom in known manner. The resulting aqueous phase is separated from the phase containing the dithiophosphoric acid diester.

6 Claims, No Drawings

PROCESS FOR EXTRACTING HEAVY METAL IONS FROM AQUEOUS SOLUTIONS

This application is a continuation of Ser. No. 396,239 filed July 08, 1982, now abandoned.

The present invention relates to a process for the liquid/liquid-extraction of heavy metal ions, especially ions of cadmium, copper, zinc and arsenic, from aqueous solutions with the use of water-insoluble dialkyldithiophosphoric acid esters as extraction agents.

Aqueous phosphoric acid solutions normally contain the metal ions in the form of complex compounds which are difficult to remove therefrom.

Wet-processed phosphoric acid, for example, contains a wide variety of contaminants, inter alia ecologically relevant heavy metals, e.g. copper, arsenic and especially cadmium.

It has been described (Published European Patent Application No. 0 022 477) that phosphoric acid raffinate containing all the contaminants originating from crude phosphoric acid in relatively high concentration is obtained on subjecting wet-processed phosphoric acid to extractive decontamination by means of organic solvents. The raffinate consists essentially of residual quantities of phosphoric acid which is no longer extractable and, depending on the process conditions, more or less important proportions of sulfuric acid. For deposition, it is necessary for this raffinate to be neutralized with a base, e.g. lime, and converted to solid insoluble material (European Patent Application No. 0 017 741). As a result, large quantities of deposition products are obtained which however are generally acceptable ecologically. Despite this, the deposition products are sometimes required to be freed from ecologically relevant heavy metals, e.g. cadmium, to permit their deposition on one site or other.

Various processes for freeing phosphoric acid solutions from cadmium by precipitating the latter in sulfide form have already been described. Difficulties are however associated therewith which originate from the fact that cadmium sulfide is very soluble, especially in the presence of free sulfuric acid. Sulfuric acid is incidentally contained in crude phosphoric acid as well as, in higher concentration, in the raffinate obtained on subjecting phosphoric acid to extractive decontamination.

Japanese Patent Specification No. 7 575 115, for example, describes a process wherein cadmium is precipitated from phosphoric acid solutions in an autoclave under pressure by the addition of a large excess of $Na_2S$. This process is complicated, energy-expensive and costly by the heavy use of chemicals therein.

Published European Patent Application No. 0 023 195 discloses a process wherein the free sulfuric acid is neutralized by the addition of a base and the cadmium is then precipitated by means of a water-soluble metal sulfide. As a result, the phosphoric acid is subjected to partial neutralization affecting its quality and even $P_2O_5$ may under circumstances be found to become co-precipitated. Common to the processes described heretofore is the need first to filter off large quantities of acid and then to extract gas therefrom.

As indicated in this latter Patent, the non-occurrence of calcium sulfide-precipitation is attributable not only to the low pH-value of phosphoric acid but also and more particularly to its content of free sulfuric acid. In other words, in order to make effective use of this process, it is necessary to provide for a very large phosphoric acid/sulfuric acid-ratio which however cannot be established, e.g. in raffinate containing more $H_2SO_4$ than $H_3PO_4$, such as that which is obtained by subjecting phosphoric acid to extractive decontamination.

It has also been suggested that dialkyldithiophosphoric acid esters should be used as liquid/liquid-extractants for extracting bivalent heavy metal cations from aqueous sulfuric acid or hydrochloric acid solutions with a normality of not more than 1. (cf. Soviet Union Patent Spectifications Nos. 541 882 and 447 936). Mixtures comprised of dialkyldithiophosphoric acid esters and trialkylphosphoric acid esters are said to produce very favorable results, especially in more acid media (DE-OS No. 2 717 302).

European Patent Application No. 0 023 428 discloses the extraction of metals from sulfuric acid solutions by means of diorganyldithiophosphoric acid esters containing, in the organyl group, at least one electron acceptor in the form of a halogen, nitro, cyano, amino or alkoxy group. In some cases, the metal extractability is indeed improved however at the price of the extraction yields, which are impaired.

In contrast with this, the extraction from phosphoric acid solutions, especially from those with high $P_2O_5$-contents therein, has never been tried heretofore, as far as we are aware. The extraction of metals with a valency higher than 2 from phosphoric acid with the aid of organic or organo-phosphorus extractants has also been described repeatedly. As a result of the complexing power of the phosphate ion the distribution equilibria cannot be said to be very favorable. It is possible, for example, by the use of an extractant system comprised of di(2-ethylhexyl)phosphoric acid/tri-n-octylphosphine oxide (briefly termed DEHPA and TOPO hereinafter) to extract uranium or vanadium from so-called green phosphoric acid with a maximum $P_2O_5$-concentration of 30% therein. The extraction coefficients are smaller than 10 so that it is necessary for the extraction to be effected in several stages, and for the phase ratio of A:O (inorganic to organic phase) to be kept low. From concentrated crude phosphoric acid (approximately 50% $P_2O_5$) however the metal cannot be extracted in the manner just described. Other extraction systems, such e.g. as diphosphoric acid esters, which have higher distribution coefficients, are liable rapidly to undergo hydrolytic decomposition.

Pure DEHPA or DEHPA/TOPO-mixtures cannot be used for the extraction of ecologically relevant bivalent heavy metals, such as Cu, Cd and Zn or even arsenic, from phosphoric acid.

It is therefore an object of this invention to provide a process which enables heavy metal ions, especially ions of copper, cadmium, zinc and arsenic to be removed from phosphoric acid solutions, even from those with heavy $P_2O_5$-concentrations of from 40 to 60% therein, with the use of an extractant which produces a high distribution coefficient, is easy to separate from the phosphoric acid phase, retains its full extracting power, even after repeated re-extraction with a mineral acid or alkali, and remains substantially free from decomposition phenomena.

This object can unexpectedly be achieved by the process of this invention, wherein phosphoric acid solutions with a $P_2O_5$-content of from 3 to 80%, preferably 6 to 60%, are used, the solutions being free from emulsion-forming organic contaminants or having been previously freed therefrom in known manner, the solutions are extracted by means of water insoluble dithiophosphoric acid diesters and the resulting aqueous phase is separated from the phase containing the dithiophosphoric acid diesters.

The useful diesters comprise more particularly dialkyldithiophosphoric acid esters with a chain length of 4 to 18 carbon atoms in the alkyl group.

Especially in those cases in which it is desirable for the extracted metals to be put to further use, it is good practice to use the dithiophosphoric acid diesters in the form of a solution in a water-insoluble organic solvent, e.g. kerosene, and to re-extract the separated diester phase with an aqueous hydrohalic acid solution, the metals going forward into the aqueous phase. Hydrobromic acid or hydriodic acid should preferably be used as the hydrohalic acid. It is preferable first to re-extract the separated diester phase with an aqueous solution of an alkaline compound and then to treat it with the hydrohalic acid and ultimately to combine resulting alkaline extract with resulting hydrohalic acid extract, if desired with addition of further quantities of an alkaline compound so as to obtain a mixture with apH-value of at least 7.

Diesters with a purity of more than 95%, such as those which are obtained from $P_4O_{10}$ and alcohol in the presence of catalysts, should preferably be employed as they were found, even after repeated extraction and re-extraction, to retain their full extracting power and to remain substantially free from decomposition phenomena.

This produces a technically beneficial effect, namely that it is possible to circulate the diesters, if desired together with the water-insoluble organic solvent, after re-extraction of the heavy metal ions.

In those cases in which it is not desirable to recover the separated metals, it is good practice to separate the diester phase from the aqueous phase, neutralize it with a basic compound and thereby directly to convert it into deposition material. In this case, it is naturally good practice either to carry out the process in the absence of organic solvent or to separate the latter from the diester phase.

The diesters should be used in proportions of from 0.05 to 40 weight %, preferably 0.2 to 20 weight %, based on the quantity of phosphoric acid solution.

The present process would not have been expected by the skilled artisan to permit metal ions, e.g. cadmium and copper ions, to be extracted quantitiatively and even arsenic ions to be extracted at least partially with very high distribution coefficients from concentrated phosphoric acid solutions with $P_2O_5$-concentrations as high as about 50 weight %, which are known for their property of forming stable complexes with heavy metal ions.

The distribution coefficients are more particularly so high that copper and cadmium are practically completely removed in a one-step operation, even in the event of the phase ratio of phosphoric acid phase to organic phase (10 weight % solution of dialkyldithiophosphoric acid ester in kerosene) being 50:1.

It is most advantageous however in two partial steps to extensively free the organic phase from heavy metals, i.e. by first treating the extract phase by means of a dilute sodium hydroxide solution with re-extraction of arsenic and partially of cadmium and zinc, for example, and then treating it by means of a hydrohalic acid with quantitative re-extraction of cadmium and zinc and re-extraction of the bulk of copper.

During the treatment just described, the dialkyldithiophosphoric acid ester, which is partially present in salt form is quantitatively reconverted to acid.

The sodium hydroxide phase and acid phase containing the heavy metals are united and the whole is neutralized by means of a base, preferably lime, the metals being converted, e.g. to insoluble hydroxides which can be disposed of or worked up.

To ensure continuous operation with extensive removal of the elements Cu, Cd and As, it is good practice to effect the re-extraction through several cycles with hydrochloric acid alone, the elements having high distribution coefficients (e.g. Cd, Zn) being stripped and those having very low re-extraction distribution coefficients, e.g. Cu and As, becoming concentrated in the extract. Inasmuch as after a certain number of extraction/re-extraction cycles the extract phase is under maximum load with these elements, it is necessary for these latter to be re-extracted with an alkaline agent (for As) or acid medium, e.g. hydrobromic or hydriodic acid (e.g. for Cu).

A further preferred variant of the present process for removing the heavy metals from phosphoric acid solutions provides for the re-extraction step to be generally omitted. In this case a solution of dialkyldithiophosphoric acid in a low-boiling inert solvent, e.g. hexane or petroleum ether, is used. Next, the metal-loaded organic phase is freed in convenient fashion from the solvent by stripping and the remaining acid mixture of salts and free dialkyldithiophosphoric acid is neutralized with a suitable base, e.g. lime. It is naturally possible for the solvent to be completely omitted.

As to the particular dialkyldithiophosphoric acid ester to be selected, it should be borne in mind that the extracting power decreases with an increasing chain length in the alkyl group while the re-extractability with acids from the organic phase increases. In other words, the ester should be selected in accordance with requirements. In the interest of the highest possible re-extractability, especially of copper, it is good practice to use dialkyldithiophosphoric acid esters with 8 to 14 carbon atoms in the alkyl group.

While the phase ratio of inorganic phase (A) to organic phase (O) to be selected for extraction is variable within wide limits and can be adapted to the respective cation-content of the phosphoric acid solution, it is again good practice in the interest of the highest possible selectivity to use an A:O-ratio as large as possible so that the elements with high distribution coefficients (Cu, Cd) to be eliminated can still be extracted almost quantitatively and displace the other metals in the complex-forming reaction.

The re-extraction step with hydrochloric acid can also be effected at a high A:O-phase ratio, e.g. at a ratio greater than 20:1, which does not interfere with the distribution coefficient e.g. of Cd and Zn. In the event of the re-extraction being effected with the use of hydrobromic acid, the ratio should preferably not exceed 5:1 as the distribution coefficient e.g. for Cu is not particularly high.

The following Examples illustrate the invention which is naturally not limited thereto:

EXAMPLES 1 TO 5

Commercially available crude phosphoric acid from Morocco (46 weight % $P_2O_5$, 0.4 weight % $SO_4$, 200 ppm $C_{org.}$) was used in Examples 2 to 5 and a mixture thereof with crude acid from Florida (49 weight %

$P_2O_5$, 0,6 weight % $SO_4$, 300 ppm $C_{org.}$) was used in Example 1. The acid and acid mixture had been pre-purified in known manner with active carbon and lime (so-called green acid). They were admixed in variable ratios by volume with a 10 weight % solution of a dialkyldithiophosphoric acid ester $(RO)_2PSSH$ in kerosene and intensively stirred over 15 minutes. The two phases were allowed to deposit and analyzed. The results obtained are indicated in Table 1 hereinafter.

EXAMPLE 6

The procedure was as in Examples 1 to 5 but green acid containing 30 weight % $P_2O_5$ was used; this acid is incidentally often used as a starting material for the extraction of uranium therefrom. The results obtained are indicated in Table 1 hereinafter.

EXAMPLE 7

The crude phosphoric acid used in the preceding Examples was replaced by raffinate (residue) stripped from dissolved alcohol and originating from the extractive decontamination of phosphoric acid. The raffinate is obtained by extracting green concentrated crude phosphoric acid with amyl alcohol with addition of sulfuric acid (7.4 weight % $P_2O_5$, 11.6 weight % $SO_4$, 200 ppm $C_{org.}$). The results obtained are indicated in Table 1 hereinafter.

EXAMPLES 8 to 10

An extract which contained 10 weight % di(2-ethylhexyl)dithiophosphoric acid, 0.17 weight % Cd, 0.34 weight % Cu, 0.047 weight % As and 0.1 weight % Zn dissolved in kerosene was re-extracted at an A:O-ratio of 1:20 with hydrochloric acid of 36 weight % strength or at an A:O-ratio of 1:1 with hydrobromic acid of 48 weight % strength or at an A:O-ratio of 1:5 with sodium hydroxide solution of 10 weight % strength. The results obtained are indicated in Table 2 hereinafter.

EXAMPLE 11

A hydrochloric acid phase of 36 weight % originating from the re-extraction step (0.9 weight % Cd; 0.5 weight % Zn) and sodium hydroxide phase of 5 weight % (0.07 weight % As) were combined in the quantitative ratio of 1:1, the whole was neutralized with lime up to a pH-value of 10.5 and the suspension was filtered by means of a suction filter. The filtrate was found to contain less than 1 ppm Cd, 2 ppm As and 7 ppm Zn.

Filtrate containing less than 1 ppm Cu was obtained by subjecting copper-containing hydrobromic acid (1 weight % Cu, 48 weight % HBr) to the neutralizing and filtering steps just described.

EXAMPLE 12

Fresh specimens of the crude acid used in Examples 2 to 5 were in each case extracted five times at an A:O-ratio of 10:1 with a 10 weight % solution of di(2-ethylhexyl)dithiophosphoric acid in kerosene. After each extraction step, the organic phase was re-extracted successively with sodium hydroxide solution of 10 weight % strength and hydrochloric acid of 36 weight % strength, in each case in an A:O-ratio of 1:10. After having been extracted 5 times, the phosphoric acid was found to contain less than 0.5 ppm Cd, less than 0.5 ppm Cu and 4 ppm As.

EXAMPLE 13

The procedure was as in Example 3, but n-hexane was substituted as an organic diluent for kerosene. After extraction and phase separation, the hexane solvent was distilled off from the extract phase, recycled and used again. The remaining viscous residue was admixed with solid CaO in a ratio of 1:1.5, the whole was stirred to give a solid mass which was disposed of.

EXAMPLE 14

The extraction was effected as in Example 3 but no solvent was used. As a result, an A:O-phase ratio of 500:1 was obtained. After extraction, the acid was analyzed. The data determined were the same as those indicated in Table 1, Example 3.

TABLE 1

| | | | | Extraction | | | | | Distribution coefficient $E_a$ | | | |
|---|---|---|---|---|---|---|---|---|---|---|---|---|
| | | | | ppm | | | | | | | | |
| Example | A:O | R in $(RO)_2PSSN$ | Phase | Cd | Cu | As | Zn | Ni | Cd | Cu | Zn | Ni |
| 1 | 2:1 | 2-Ethylhexyl | a | 11 | 15 | 4 | | | >57 | >85 | n.d. | n.d. |
| | | | b | <0.5 | <0.5 | 1 | | | | | | |
| | | | c | 43 | 60 | n.d. | | | | | | |
| 2 | 20:1 | 2-Ethylhexyl | a | 21 | 36 | 10 | | | >433 | >774 | n.d. | n.d. |
| | | | b | <1 | <1 | 5 | | | | | | |
| | | | c | 840 | 1500 | n.d. | | | | | | |
| 3 | 50:1 | 2-Ethylhexyl | a | 21 | 36 | 10 | 400 | 50 | 300 | >1813 | 1.37 | 0.23 |
| | | | b | 3 | <1 | 5 | 390 | 50 | | | | |
| | | | c | 1700 | 3400 | 470 | 1000 | 22 | | | | |
| 4 | 10:1 | Dodecyl | a | 21 | 36 | 10 | | | >213 | >374 | n.d. | n.d. |
| | | | b | <1 | <1 | 6 | | | | | | |
| | | | c | 410 | 720 | n.d. | | | | | | |
| 5 | 5:1 | Octadecyl | a | 21 | 36 | 10 | | | 25 | 13 | n.d. | n.d. |
| | | | b | 14 | 10 | 6 | | | | | | |
| | | | c | 66 | 240 | n.d. | | | | | | |
| 6 | 20:1 | 2-Ethylhexyl | a | 6 | 8 | 2.5 | | | >235 | >328 | n.d. | n.d. |
| | | | b | <0.5 | <0.5 | 1 | | | | | | |
| | | | c | 200 | 280 | n.d. | | | | | | |
| 7 | 50:1 | 2-Ethylhexyl | a | n.d. | n.d. | 1 | n.d. | n.d. | >933 | >1933 | 0.53 | 0.78 |
| | | | b | <1 | <1 | 0.3 | 540 | 60 | | | | |
| | | | c | 1400 | 2900 | n.d. | 430 | 70 | | | | | a = Acid or raffinate before extraction
b = Acid or raffinate after extraction
c = Extract phase

TABLE 2

| | | Reextraction | | | | |
|---|---|---|---|---|---|---|
| | | Re-extracting | ppm in organic phase after re-extration | | | |
| Example | A:O | agent | Cd | Cu | As | Zn |
| 8 | 1:20 | HCl (36%) | <1 | 3400 | 470 | 3 |
| 9 | 1:1 | NBr (48%) | <1 | 950 | 470 | <1 |
| 10 | 1:5 | NaOH (10%) | 900 | 3400 | <10 | 100 |

We claim:

1. A process for liquid/liquid extraction of metal ions from contaminated aqueous phosphoric acid having a $P_2O_5$-content of from 3 to 80 weight-percent said process comprising:
   (a) selecting as a starting material a contaminated aqueous phosphoric acid essentially free of emulsion-forming organic contaminants and containing ions of cadmium, copper, zinc, or arsenic, or mixtures thereof, in the form of complex compounds;
   (b) extracting the ions of cadmium, copper, zinc or arsenic from said phosphoric acid by contacting said phosphoric acid with an extracting agent consisting essentially of a water-insoluble dithiophosphoric acid diester, thereby obtaining an aqueous phosphoric acid phase containing less of the said ions and a diester phase containing the said extracting agent;
   (c) separating the aqueous phosphoric acid phase from the phase of the extracting agent;
   (d) reextracting said cadmium, copper, zinc or arsenic from said diester phase by treating the diester phase separated from the aqueous phosphoric acid phase with an aqueous solution of an alkaline compound and obtaining thereby an aqueous alkaline extract;
   (e) extracting thereafter the diester phase with an aqueous hydrohalic acid solution;
   (f) mixing the hydrohalic acid-containing solution resulting from (e) with the alkaline extract obtained from (d) along with any necessary alkaline compound to obtain a mixture having a pH of at least 7, whereby hydroxides of the cadmium, copper, zinc or arsenic are precipitated and separating the precipitated hydroxides from the mixture.

2. The process as claimed in claim 1, wherein the extracting agents are selected from dialkyldithiophosphoric acid esters with a chain length of 4 to 18 carbon atoms in the alkyl group 1.

3. The process as claimed in claim 1, wherein the dithiophosphoric acid diesters are used in the form of a solution in a water-insoluble organic solvent.

4. The process as claimed in claim 1, wherein the dithiophosphoric acid diester used has a purity of more than 95%.

5. The process as claimed in claim 1, wherein the dithiophosphoric acid diesters are used in proportions of from 0.05 to 40 weight %, based on the quantity of phosphoric acid solution.

6. A process according to claim 1, wherein said contaminated aqueous phosphoric acid is crude wet-process phosphoric acid having a $P_2O_5$ content of 6 to 60% by weight.

* * * * *